(12) United States Patent
Li et al.

(10) Patent No.: US 11,853,883 B2
(45) Date of Patent: *Dec. 26, 2023

(54) SYSTEM AND METHOD FOR INSTANCE-LEVEL LANE DETECTION FOR AUTONOMOUS VEHICLE CONTROL

(71) Applicant: TuSimple, Inc., San Diego, CA (US)

(72) Inventors: Tian Li, San Diego, CA (US); Panqu Wang, San Diego, CA (US); Pengfei Chen, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 340 days.

This patent is subject to a terminal disclaimer.

(21) Appl. No.: 17/214,828

(22) Filed: Mar. 27, 2021

(65) Prior Publication Data

US 2021/0216792 A1    Jul. 15, 2021

Related U.S. Application Data

(63) Continuation of application No. 15/959,167, filed on Apr. 20, 2018, now Pat. No. 10,970,564, which is a
(Continued)

(51) Int. Cl.
*G06N 3/00*  (2023.01)
*G06N 3/08*  (2023.01)
(Continued)

(52) U.S. Cl.
CPC .............. *G06N 3/08* (2013.01); *G06F 18/214* (2023.01); *G06F 18/2178* (2023.01);
(Continued)

(58) Field of Classification Search
CPC .......... G06N 3/08; G06N 20/00; G06N 3/045; G06V 10/454; G06V 10/764;
(Continued)

(56) References Cited

U.S. PATENT DOCUMENTS 6,777,904 B1    8/2004  Degner
7,103,460 B1    9/2006  Breed
(Continued)

FOREIGN PATENT DOCUMENTS

EP    1754179 A1    2/2007
EP    2448251 A2    5/2012
(Continued)

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.

(Continued)

*Primary Examiner* — Mahmoud S Ismail
(74) *Attorney, Agent, or Firm* — INVENTIVE LAW INC.; Jim H. Salter

(57) ABSTRACT

A system and method for instance-level lane detection for autonomous vehicle control are disclosed. A particular embodiment includes: receiving image data from an image data collection system associated with an autonomous vehicle; performing an operational phase comprising extracting roadway lane marking features from the image data, causing a plurality of trained tasks to execute concurrently to generate instance-level lane detection results based on the image data, the plurality of trained tasks having been individually trained with different features of training image data received from a training image data collection system and corresponding ground truth data, the training image data and the ground truth data comprising data collected from real-world traffic scenarios; causing the plurality of trained tasks to generate task-specific predictions of feature characteristics based on the image data and to generate corresponding instance-level lane detection results; and providing (Continued)

the instance-level lane detection results to an autonomous vehicle subsystem of the autonomous vehicle.

20 Claims, 9 Drawing Sheets

Related U.S. Application Data continuation-in-part of application No. 15/721,797, filed on Sep. 30, 2017, now Pat. No. 10,962,979.

(51) Int. Cl.
*G06N 20/00* (2019.01)
*G06V 20/56* (2022.01)
*G06V 10/44* (2022.01)
*G06F 18/214* (2023.01)
*G06F 18/21* (2023.01)
*G06F 18/2413* (2023.01)
*G06N 3/045* (2023.01)
*G06V 10/764* (2022.01)

(52) U.S. Cl.
CPC ....... *G06F 18/24143* (2023.01); *G06N 3/045* (2023.01); *G06N 20/00* (2019.01); *G06V 10/454* (2022.01); *G06V 10/764* (2022.01); *G06V 20/588* (2022.01)

(58) Field of Classification Search
CPC .............. G06V 20/588; G06F 18/2178; G06F 18/24143; G06F 18/214
USPC ......................................................... 701/23
See application file for complete search history.

(56) References Cited

U.S. PATENT DOCUMENTS

| | | | |
|---|---|---|---|
| 7,689,559 B2 | 3/2010 | Canright | |
| 7,783,403 B2 | 8/2010 | Breed | |
| 7,844,595 B2 | 11/2010 | Canright | |
| 8,041,111 B1 | 10/2011 | Wilensky | |
| 8,064,643 B2 | 11/2011 | Stein | |
| 8,082,101 B2 | 12/2011 | Stein | |
| 8,164,628 B2 | 4/2012 | Stein | |
| 8,175,376 B2 | 5/2012 | Marchesotti | |
| 8,271,871 B2 | 9/2012 | Marchesotti | |
| 8,378,851 B2 | 2/2013 | Stein | |
| 8,392,117 B2 | 3/2013 | Dolgov | |
| 8,401,292 B2 | 3/2013 | Park | |
| 8,412,449 B2 | 4/2013 | Trepagnier | |
| 8,478,072 B2 | 7/2013 | Aisaka | |
| 8,553,088 B2 | 10/2013 | Stein | |
| 8,788,134 B1 | 7/2014 | Litkouhi | |
| 8,908,041 B2 | 12/2014 | Stein | |
| 8,917,169 B2 | 12/2014 | Schofield | |
| 8,963,913 B2 | 2/2015 | Baek | |
| 8,965,621 B1 | 2/2015 | Urmson | |
| 8,981,966 B2 | 3/2015 | Stein | |
| 8,993,951 B2 | 3/2015 | Schofield | |
| 9,002,632 B1 | 4/2015 | Emigh | |
| 9,008,369 B2 | 4/2015 | Schofield | |
| 9,025,880 B2 | 5/2015 | Perazzi | |
| 9,042,648 B2 | 5/2015 | Wang | |
| 9,111,444 B2 | 8/2015 | Kaganovich | |
| 9,117,133 B2 | 8/2015 | Barnes | |
| 9,118,816 B2 | 8/2015 | Stein | |
| 9,120,485 B1 | 9/2015 | Dolgov | |
| 9,122,954 B2 | 9/2015 | Srebnik | |
| 9,134,402 B2 | 9/2015 | Sebastian | |
| 9,145,116 B2 | 9/2015 | Clarke | |
| 9,147,255 B1 | 9/2015 | Zhang | |
| 9,156,473 B2 | 10/2015 | Clarke | |
| 9,176,006 B2 | 11/2015 | Stein | |
| 9,179,072 B2 | 11/2015 | Stein | |
| 9,183,447 B1 | 11/2015 | Gdalyahu | |
| 9,185,360 B2 | 11/2015 | Stein | |
| 9,191,634 B2 | 11/2015 | Schofield | |
| 9,233,659 B2 | 1/2016 | Rosenbaum | |
| 9,233,688 B2 | 1/2016 | Clarke | |
| 9,248,832 B2 | 2/2016 | Huberman | |
| 9,248,835 B2 | 2/2016 | Tanzmeister | |
| 9,251,708 B2 | 2/2016 | Rosenbaum | |
| 9,277,132 B2 | 3/2016 | Berberian | |
| 9,280,711 B2 | 3/2016 | Stein | |
| 9,286,522 B2 | 3/2016 | Stein | |
| 9,297,641 B2 | 3/2016 | Stein | |
| 9,299,004 B2 | 3/2016 | Lin | |
| 9,315,192 B1 | 4/2016 | Zhu | |
| 9,317,033 B2 | 4/2016 | Ibanez-guzman | |
| 9,317,776 B1 | 4/2016 | Honda | |
| 9,330,334 B2 | 5/2016 | Lin | |
| 9,342,074 B2 | 5/2016 | Dolgov | |
| 9,355,635 B2 | 5/2016 | Gao | |
| 9,365,214 B2 | 6/2016 | Ben Shalom | |
| 9,399,397 B2 | 7/2016 | Mizutani | |
| 9,428,192 B2 | 8/2016 | Schofield | |
| 9,436,880 B2 | 9/2016 | Bos | |
| 9,438,878 B2 | 9/2016 | Niebla | |
| 9,443,163 B2 | 9/2016 | Springer | |
| 9,446,765 B2 | 9/2016 | Ben Shalom | |
| 9,459,515 B2 | 10/2016 | Stein | |
| 9,466,006 B2 | 10/2016 | Duan | |
| 9,476,970 B1 | 10/2016 | Fairfield | |
| 9,490,064 B2 | 11/2016 | Hirosawa | |
| 9,531,966 B2 | 12/2016 | Stein | |
| 9,535,423 B1 | 1/2017 | Debreczeni | |
| 9,555,803 B2 | 1/2017 | Pawlicki | |
| 9,568,915 B1 | 2/2017 | Berntorp | |
| 9,587,952 B1 | 3/2017 | Slusar | |
| 9,720,418 B2 | 8/2017 | Stenneth | |
| 9,723,097 B2 | 8/2017 | Harris | |
| 9,723,099 B2 | 8/2017 | Chen | |
| 9,738,280 B2 | 8/2017 | Rayes | |
| 9,746,550 B2 | 8/2017 | Nath | |
| 9,953,236 B1 | 4/2018 | Huang | |
| 10,147,193 B2 | 12/2018 | Huang | |
| 10,303,956 B2 | 5/2019 | Huang | |
| 2007/0230792 A1 | 10/2007 | Shashua | |
| 2008/0249667 A1 | 10/2008 | Horvitz | |
| 2009/0040054 A1 | 2/2009 | Wang | |
| 2010/0049397 A1 | 2/2010 | Lin | |
| 2010/0226564 A1 | 9/2010 | Marchesotti | |
| 2010/0281361 A1 | 11/2010 | Marchesotti | |
| 2011/0206282 A1 | 8/2011 | Aisaka | |
| 2012/0105639 A1 | 5/2012 | Stein | |
| 2012/0140076 A1 | 6/2012 | Rosenbaum | |
| 2012/0274629 A1 | 11/2012 | Baek | |
| 2014/0145516 A1 | 5/2014 | Hirosawa | |
| 2014/0198184 A1 | 7/2014 | Stein | |
| 2015/0062304 A1 | 3/2015 | Stein | |
| 2015/0112182 A1* | 4/2015 | Sharma | G06F 18/214 600/408 |
| 2015/0353082 A1 | 12/2015 | Lee | |
| 2016/0037064 A1 | 2/2016 | Stein | |
| 2016/0094774 A1 | 3/2016 | Li | |
| 2016/0129907 A1 | 5/2016 | Kim | |
| 2016/0165157 A1 | 6/2016 | Stein | |
| 2016/0210528 A1 | 7/2016 | Duan | |
| 2016/0321381 A1 | 11/2016 | English | |
| 2016/0375907 A1 | 12/2016 | Erban | |
| 2017/0236013 A1* | 8/2017 | Clayton | G06V 10/774 382/104 |
| 2018/0260668 A1* | 9/2018 | Shen | G06V 10/82 |
| 2018/0260956 A1 | 9/2018 | Huang | |
| 2018/0373980 A1* | 12/2018 | Huval | G06F 18/41 |
| 2019/0065867 A1 | 2/2019 | Huang | |
| 2019/0065944 A1 | 2/2019 | Hotson | |
| 2019/0102656 A1* | 4/2019 | Kwant | G01C 21/3602 |
| 2020/0013307 A1 | 1/2020 | Chen | |

(56) References Cited

U.S. PATENT DOCUMENTS

FOREIGN PATENT DOCUMENTS

| EP | 2463843 A2 | 6/2012 |
|---|---|---|
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125022 | 8/2015 |
| WO | WO/2015/186002 A2 | 12/2015 |
| WO | WO/2015/186002 A3 | 12/2015 |
| WO | WO/2016/135736 | 9/2016 |
| WO | WO/2017/013875 A1 | 1/2017 |

OTHER PUBLICATIONS

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching for Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302.5985, pp. 1-4, Feb. 25, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, pp. 1-12, Nov. 8, 2016.

Li, Yanghao and Wang, Naiyan and Liu, Jiaying and Hou, Xiaodi, "Demystifying Neural Style Transfer", arXiv preprint arXiv:1701.01036, pp. 1-8, Jan. 4, 2017.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, pp. 1-10, Feb. 27, 2017.

Li, Yanghao and Wang, Naiyan and Liu, Jiaying and Hou, Xiaodi, "Factorized Bilinear Models for Image Recognition", arXiv preprint arXiv:1611.05709, pp. 1-9, Nov. 17, 2016.

Hou, Xiaodi, "Computational Modeling and Psychophysics in Low and Mid-Level Vision", California Institute of Technology, pp. i to xi and 1-114, May 7, 2014.

Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.

Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, pp. 13-23, Jan. 1, 2001.

Kyoungho Ahn, Hesham Rakha, "The Effects of Route Choice Decisions on Vehicle Energy Consumption and Emissions", Virginia Tech Transportation Institute, Blacksburg, VA 24061, pp. 1-32, May 1, 2008.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV], pp. 1-8, Dec. 20, 2016.

Schroff, Florian, Dmitry Kalenichenko, James Philbin, (Google), "FaceNet: A Unified Embedding for Face Recognition and Clustering", pp. 1-10, CVPR Jun. 17, 2015.

Dai, Jifeng, Kaiming He, Jian Sun, (Microsoft Research), "Instance-aware Semantic Segmentation via Multi-task Network Cascades", pp. 1-10, CVPR Dec. 14, 2015.

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO], pp. 1-7, Apr. 17, 2015.

Tian Li, "Proposal Free Instance Segmentation Based on Instance-aware Metric", Department of Computer Science, Cranberry-Lemon University, Pittsburgh, PA., pp. 1-2, 2015.

Mohammad Norouzi, David J. Fleet, Ruslan Salakhutdinov, "Hamming Distance Metric Learning", Departments of Computer Science and Statistics, University of Toronto, pp. 1-9, 2012.

Jain, Suyong Dutt, Grauman, Kristen, "Active Image Segmentation Propagation", In Proceedings of the IEEE Conference on Computer Vision and Pattern Recognition (CVPR), pp. 1-10, Las Vegas, Jun. 2016.

MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), pp. 1-8, 2014.

Kendall, Alex, Gal, Yarin, "What Uncertainties Do We Need in Bayesian Deep Learning for Computer Vision", arXiv:1703.04977v1 [cs.CV], pp. 1-11, Mar. 15, 2017.

Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, pp. 512-517, Jun. 21-24, 2010.

Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, pp. 1-9, 2010.

Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV], pp. 1-7, Nov. 29, 2016.

P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

C. Yang, Z. Li, R. Cui and B. Xu, "Neural Network-Based Motion Control of an Underactuated Wheeled Inverted Pendulum Model,"

(56) References Cited

OTHER PUBLICATIONS in IEEE Transactions on Neural Networks and Learning Systems, vol. 25, No. 11, pp. 2004-2016, Nov. 2014.

Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, pp. 1-16, 2016.

Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, pp. 298-312, Mar. 2007.

Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, pp. 1-11, 2016.

Adhiraj Somani, Nan Ye, David Hsu, and Wee Sun Lee, "DESPOT: Online POMDP Planning with Regularization", Department of Computer Science, National University of Singapore, pp. 1-9, 2013.

Adam Paszke, Abhishek Chaurasia, Sangpil Kim, and Eugenio Culurciello. Enet: A deep neural network architecture for real-time semantic segmentation. CoRR, abs/1606.02147, pp. 1-10, 2016.

Szeliski, Richard, "Computer Vision: Algorithms and Applications" http://szeliski.org/Book/, pp. i to xxii and 1-957, 2010.

Tsung-Yi Lin, Priya Goyal, Ross Girshick, Kaiming He, Piotr Doll'ar, "Focal Loss for Dense Object Detection", Facebook AI Research (FAIR), 2017.

Evan Shelhamer, Jonathan Long, and Trevor Darrell, "Fully Convolutional Networks for Semantic Segmentation", arXiv: 1605.06211v1 [cs.CV] May 20, 2016.

Adam Paszke, Abhishek Chaurasia, Sangpil Kim & Eugenio Culurciello, "ENET: A Deep Neural Network Architecture for Real-Time Semantic Segmentation", conference paper at ICLR 2017.

* cited by examiner

SYSTEM AND METHOD FOR INSTANCE-LEVEL LANE DETECTION FOR AUTONOMOUS VEHICLE CONTROL

PRIORITY PATENT APPLICATIONS

This non-provisional patent application is a continuation application drawing priority from U.S. non-provisional patent application Ser. No. 15/959,167; filed Apr. 20, 2018; which is a continuation-in-part (CIP) patent application drawing priority from U.S. non-provisional patent application Ser. No. 15/721,797; filed Sep. 30, 2017. This present non-provisional patent application draws priority from the referenced patent applications. The entire disclosure of the referenced patent applications is considered part of the disclosure of the present application and is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2017-2021, TuSimple, Inc., All Rights Reserved.

TECHNICAL FIELD

This patent document pertains generally to tools (systems, apparatuses, methodologies, computer program products, etc.) for vehicle control systems, and autonomous driving systems, route planning, trajectory planning, image processing, and more particularly, but not by way of limitation, to a system and method for instance-level lane detection for autonomous vehicle control.

BACKGROUND

Processing subsystems within autonomous vehicles typically include decision making subsystems, trajectory planning, image processing, and control operations, among other subsystems. These autonomous vehicle processing subsystems are responsible for receiving a substantial amount of sensor data and other input and for accurately processing this input data in real time. The processing loads can be very high and the available processing time is very short. The safety and efficiency of the autonomous vehicle and its occupants depend on the ability of these autonomous vehicle processing subsystems to perform as needed. It is certainly possible to configure an autonomous vehicle control system with high-powered and expensive data processing systems that will handle the processing loads. However, there is constant pressure in the marketplace to design and build autonomous vehicle control systems with lowest cost, lightest weight, lowest power requirements, lowest operating temperatures, and high levels of adaptability and customization. Conventional autonomous vehicle control systems have been unable to meet this challenge while providing responsive, reliable, and efficient autonomous vehicle control.

One significant processing load in autonomous vehicle control systems is image processing from vehicle cameras. This image processing typically includes the use of image semantic segmentation. Image semantic segmentation is intended to identify the image regions corresponding directly to objects in an image by labeling each pixel in the image to a semantic category. Contrary to the object detection, which merely detects the objects in the image, semantic segmentation assigns a category label to each pixel to indicate an object category to which the pixel belongs. As such, semantic segmentation aims to assign a categorical label to every pixel in an image, which plays an important role in image analysis and self-driving systems. However, semantic segmentation assigns the same categorical label to every instance of the same object type in an image. Thus, semantic segmentation cannot differentiate between different instances of the same object type, such as multiple lane markings on a roadway.

SUMMARY

A system and method for instance-level lane detection for autonomous vehicle control are disclosed herein. Specifically, the present disclosure relates to systems, methods, and devices that facilitate the image processing, decision making, and control processes in an autonomous driving mode. In an example embodiment, an autonomous vehicle computation and control system can be configured to determine the intrinsic similarity of features in image or perception data received from the sensors or image capture devices of an autonomous vehicle. The similar or shared features can have corresponding tasks that can be configured to execute concurrently to save serial task-specific execution time and achieve higher data processing speeds. In example embodiments, a portion of the computation load, represented by the multiple tasks of the shared features, can be associated with shared layers among different pixel-level image segmentation. The multiple tasks in these shared layers can be configured to execute concurrently, thereby increasing processing parallelism and decreasing aggregate execution time.

One application of the multitask processing environment of an example embodiment is the allocation of different tasks to different instances of lane markings detected in an input image. In this manner, instance-level lane detection using image segmentation can be achieved. Instance-level lane segmentation is the task configured for recognizing all the lanes or lane markings in an input image, and distinguishing each lane instance from other lane instances from the same image. Instance-level lane segmentation is one of the core tasks for enabling autonomous driving and autonomous vehicle control. For example, as a perception result of a surrounding environment, instance-level lane segmentation can help not only lead the vehicle to the correct path, but also locate the vehicle in a local area. Example embodiments of instance-level lane detection for autonomous vehicle control are described in more detail below.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

A system and method for instance-level lane detection for autonomous vehicle control are disclosed herein. Specifically, the present disclosure relates to systems, methods, and devices that facilitate the image processing, decision making, and control processes in an autonomous driving mode. In an example embodiment, an autonomous vehicle computation and control system can be configured to determine the intrinsic similarity of features in image or perception data received from the sensors or image capture devices of an autonomous vehicle. The similar or shared features can have corresponding tasks that can be configured to execute concurrently to save serial task-specific execution time and achieve higher data processing speeds. In example embodiments, a portion of the computational load, represented by the multiple tasks of the shared features, can be associated with shared layers among different pixel-level image segmentation. The multiple tasks in these shared layers can be configured to execute concurrently, thereby increasing processing parallelism and decreasing aggregate execution time.

One application of the multitask processing environment of an example embodiment is the allocation of different tasks to different instances of lane markings detected in an input image. In this manner, instance-level lane detection using image segmentation can be achieved. Instance-level lane segmentation is the task configured for recognizing all the lanes or lane markings in an input image, and distinguishing each lane instance from other lane instances from the same image. Instance-level lane segmentation is one of the core tasks for enabling autonomous driving and autonomous vehicle control. For example, as a perception result of a surrounding environment, instance-level lane segmentation can help not only lead the vehicle to the correct path, but also locate the vehicle in a local area. Example embodiments of instance-level lane detection for autonomous vehicle control are described in more detail below.

Figure 1:
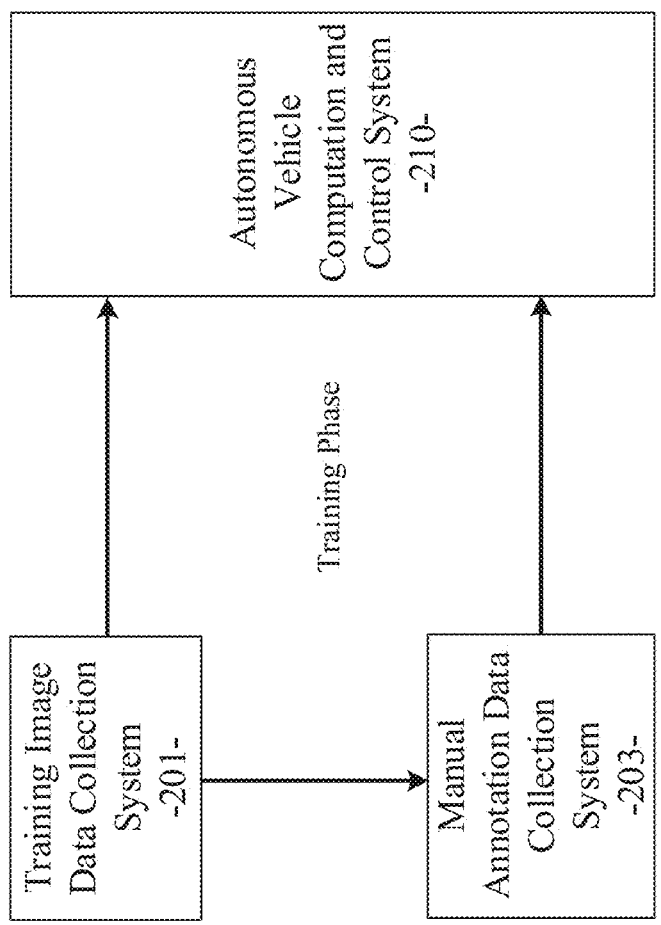
FIG. 1 illustrates a first phase for training an autonomous vehicle computation and control system in an example embodiment.

As described in various example embodiments, a system and method for instance-level lane detection for autonomous vehicle control are described herein. Referring to FIG. 1, an example embodiment disclosed herein can be used in the context of an autonomous vehicle computation and control system 210 for autonomous vehicles. FIG. 1 illustrates an offline training phase (a first phase) used to configure or train the autonomous vehicle computation and control system 210 in an example embodiment based on training image data 201 and manually annotated image data 203 representing ground truth. In the example embodiment, a training image data collection system 201 can be used gather perception data to train or configure processing parameters for the autonomous vehicle computation and control system 210 with training image data. As described in more detail below for an example embodiment, after the initial training phase, the autonomous vehicle computation and control system 210 can be used in an operational or simulation phase (a second phase) to generate image feature predictions and instance-level lane detection results based on image data received by the autonomous vehicle computation and control system 210 and based on the training the autonomous vehicle computation and control system 210 receives during the initial offline training phase.

Referring again to FIG. 1, the training image data collection system 201 can include an array of perception information gathering devices or sensors that may include image generating devices (e.g., cameras), light amplification by stimulated emission of radiation (laser) devices, light detection and ranging (LIDAR) devices, global positioning system (GPS) devices, sound navigation and ranging (sonar) devices, radio detection and ranging (radar) devices, and the like. The perception information gathered by the information gathering devices at various traffic locations can include traffic or vehicle image data, roadway data, environmental data, distance data from LIDAR or radar devices, and other sensor information received from the information gathering devices of the data collection system 201 positioned adjacent to particular roadways (e.g., monitored locations). Additionally, the data collection system 201 can include information gathering devices installed in moving test vehicles being navigated through pre-defined routings in an environment or location of interest. Some portions of the ground truth data can also be gathered by the data collection system 201.

The image data collection system 201 can collect actual trajectories of vehicles, moving or static objects, roadway features, environmental features, and corresponding ground truth data under different scenarios. The different scenarios can correspond to different locations, different traffic patterns, different environmental conditions, and the like. The image data and other perception data and ground truth data collected by the data collection system 201 reflects truly realistic, real-world traffic information related to the locations or routings, the scenarios, and the vehicles or objects being monitored. Using the standard capabilities of well-known data collection devices, the gathered traffic and vehicle image data and other perception or sensor data can be wirelessly transferred (or otherwise transferred) to a data processor of a standard computing system, upon which the image data collection system 201 can be executed. Alternatively, the gathered traffic and vehicle image data and other perception or sensor data can be stored in a memory device at the monitored location or in the test vehicle and transferred later to the data processor of the standard computing system.

As shown in FIG. 1, a manual annotation data collection system 203 is provided to apply labels to features found in the training images collected by the data collection system 201. These training images can be analyzed by human labelers or automated processes to manually define labels or classifications for each of the features identified in the training images. These identified features can include roadway lane markings. As such, the manually annotated image labels can represent the ground truth data corresponding to the training images from the image data collection system 201. These feature labels or ground truth data can be provided to the autonomous vehicle computation and control system 210 as part of the offline training phase as described in more detail below.

The traffic and vehicle image data and other perception or sensor data for training, the feature label data, and the ground truth data gathered or calculated by the training image data collection system 201 and the object or feature labels produced by the manual annotation data collection system 203 can be used to generate training data, which can be processed by the autonomous vehicle computation and control system 210 in the offline training phase. For example, as well-known, neural networks can be trained to produce configured output based on training data provided to the neural network or other machine learning system in a training phase. As described in more detail below, the training data provided by the image data collection system 201 and the manual annotation data collection system 203 can be used to train the autonomous vehicle computation and control system 210 to configure a set of tasks corresponding to the features identified in the training images and to enable multitask concurrent execution of tasks based on commonalities of the identified features. The offline training phase of the autonomous vehicle computation and control system 210 is described in more detail below.

Figure 2:
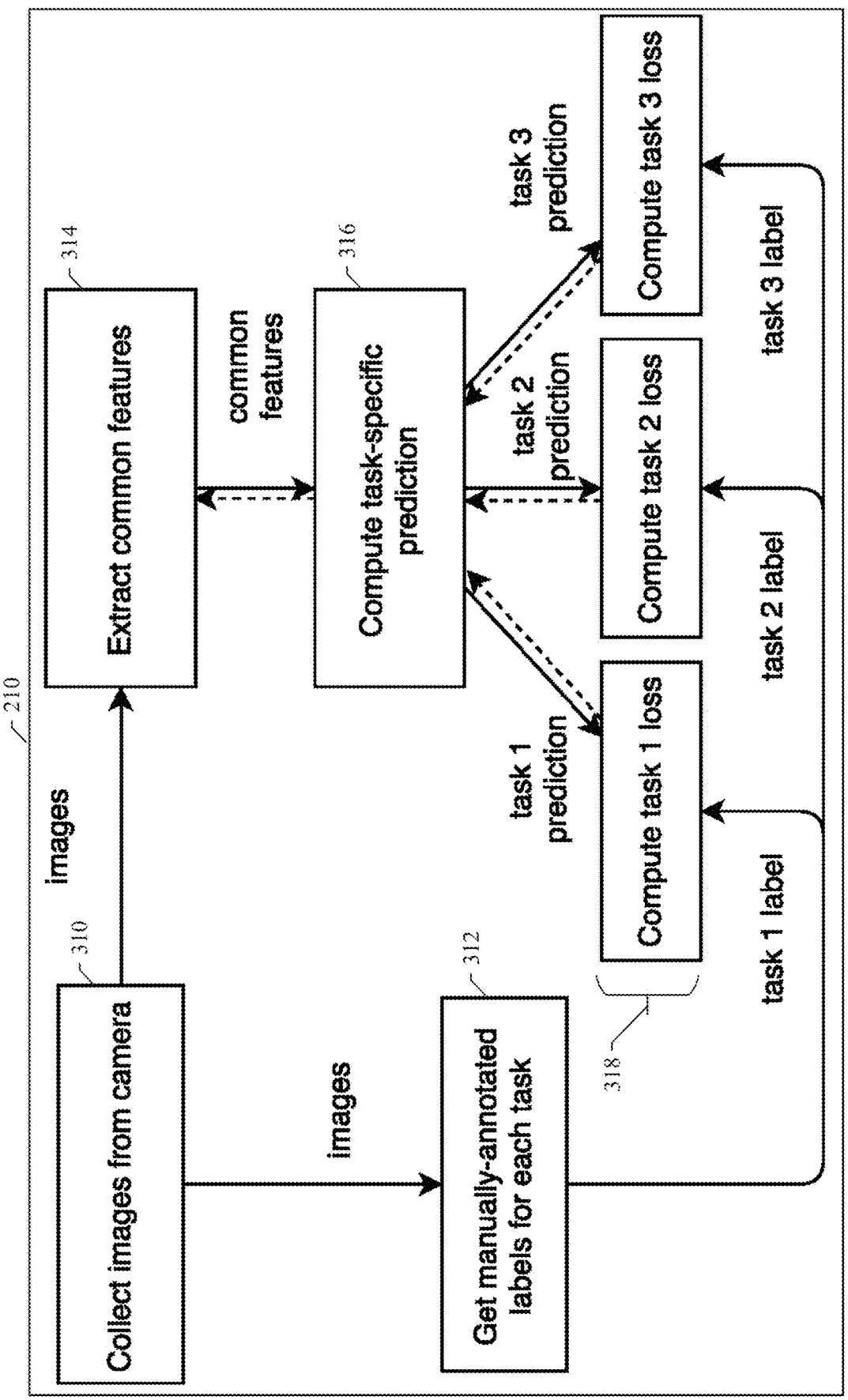
FIG. 2 illustrates a detail of the first phase for training the autonomous vehicle computation and control system in an example embodiment.

Referring now to FIG. 2, a detail of the first phase for offline training of the autonomous vehicle computation and control system 210 in an example embodiment is illustrated. In a first operational block 310 shown in FIG. 2, images are collected and provided to the autonomous vehicle computation and control system 210 by the training image data collection system 201. As described above, the images can be training images, real world images, simulated images, or other images suitable for training the machine learning components of the autonomous vehicle computation and control system 210. The images collected in block 310 can also be provided to the manual annotation data collection system 203, where the images can be manually annotated or labeled by human labelers or automated processes. The manually annotated image labels can represent the ground truth data corresponding to the training images from the training image data collection system 201.

As shown in FIG. 2, the training image data collected in block 310 can be provided to a processing block 314 of the autonomous vehicle computation and control system 210, where the features of the image data can be extracted. Semantic segmentation or similar processes can be used for the feature extraction. As well-known, feature extraction can provide a pixel-level object label for each feature identified in the image data. In many cases, the image data will contain features with common characteristics. Again, these extracted features can include roadway marking features or multiple roadway marking features from the same images. The autonomous vehicle computation and control system 210 can associate a plurality of tasks with the features identified in the image data. Alternatively, the autonomous vehicle computation and control system 210 can use a plurality of tasks to identify features or feature characteristics in the image data. During the offline training phase, these multiple tasks can be trained to predict features or feature characteristics by using the extracted feature data and computing task-specific predictions of feature characteristics in block 316. Each task of the multiple tasks can execute concurrently to produce a prediction for the corresponding task as shown in FIG. 2. These task-specific predictions of features or feature characteristics in the image data can be compared with corresponding ground truth data obtained from the manual annotation data collection system 203. Each task prediction of the multiple task predictions can be associated with the corresponding ground truth data as a task-specific label as shown in FIG. 2. Given the task-specific predictions and the corresponding task-specific ground truth, the autonomous vehicle computation and control system 210 can compute loss values (blocks 318) corresponding to the difference between the task-specific prediction for each task and the corresponding task-specific ground truth. As a result, the autonomous vehicle computation and control system 210 can generate a bias for each task corresponding to the difference between a set of predicted data and a set of labeled data based on the image data received from the cameras. This bias for each task can be used to adjust parameters in block 316 for each task to reduce the difference between the task-specific prediction for each task and the corresponding task-specific ground truth. With repeated iterations and a sufficient quantity of input training image data, the task-specific predictions will converge toward the corresponding task-specific ground truth.

In most cases, some tasks of the multiple tasks will converge more quickly than other tasks. In an example embodiment, each task can have an associated weight or weighted value that corresponds to the degree of confidence that the task is producing sufficiently accurate prediction data. The weighted value can correspond to the task biases described above or the task parameters adjusted to reduce the difference between the task-specific prediction for each task and the corresponding task-specific ground truth. The example embodiment can also establish a pre-defined confidence level that corresponds to an acceptable level of accuracy for the predicted data produced by each task. At each iteration, the weighted value of the task can be compared with the pre-defined confidence level. If the weighted value for a particular task is higher than, greater than, or exceeds the pre-defined confidence level, the particular task is subject to the offline training process as described above. Once the weighted value for a particular task is lower than, less than, equal to, or does not exceed the pre-defined confidence level, the particular task is determined to be sufficiently trained and is no longer subject to the offline training process as described above. In this manner, each of the multiple tasks are trained only so long as each task is unable to meet the pre-defined confidence level. Thus, processing resources are conserved by not continuing to train tasks that have already reached an acceptable performance level. Eventually, all or most of the multiple tasks will reach the acceptable performance level defined by the pre-defined confidence level. At this point, the offline training process is complete and the parameters associated with each task have been properly adjusted to cause the task to produce sufficiently accurate predicted features, feature characteristics, or feature labels corresponding to the input image data. After being trained by the offline training process as described above, the multiple tasks with their properly adjusted parameters can be deployed in an operational or simulation phase as described below in connection with FIGS. 3 through 5.

Figure 3:
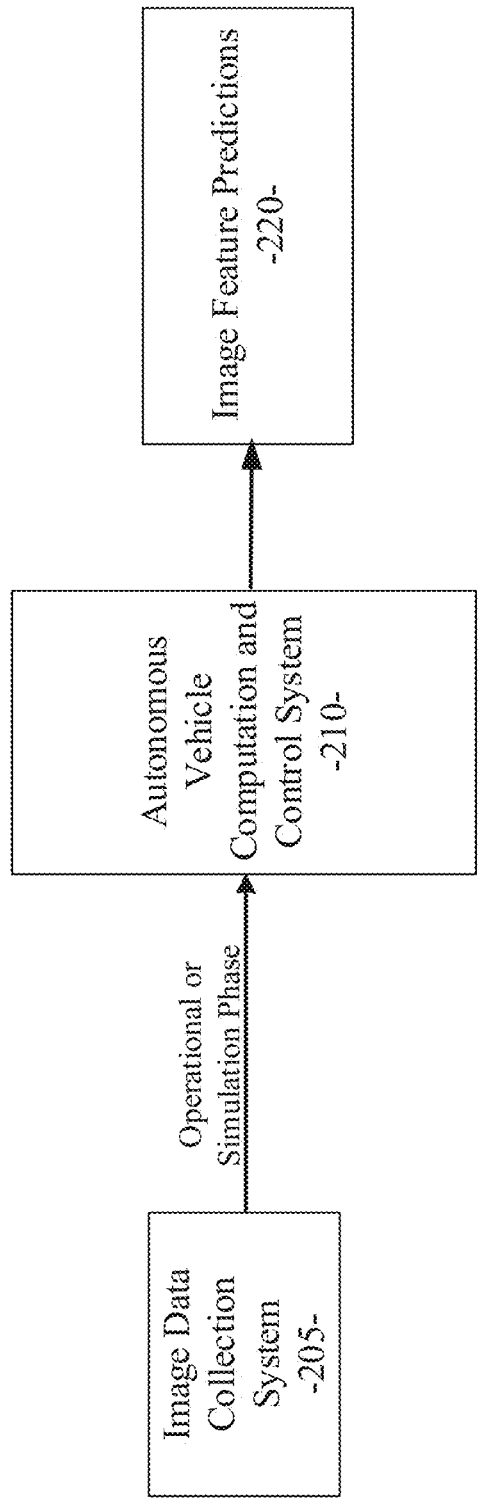
FIG. 3 illustrates a second phase for operational or simulation use of the autonomous vehicle computation and control system in an example embodiment.

FIG. 3 illustrates a second phase for operational or simulation use of the autonomous vehicle computation and control system 210 in an example embodiment. As shown in FIG. 3, the autonomous vehicle computation and control system 210 can receive image data from the image data collection system 205. The image data collection system 205 can include an array of perception information gathering devices, sensors, and/or image generating devices on or associated with an autonomous vehicle, similar to the perception information gathering devices of the image data collection system 201. As described in more detail below, the autonomous vehicle computation and control system 210 can process the input image data with the plurality of trained tasks to produce image feature predictions 220, which can be used by other autonomous vehicle subsystems to configure or control the operation of the autonomous vehicle.

Figure 4:
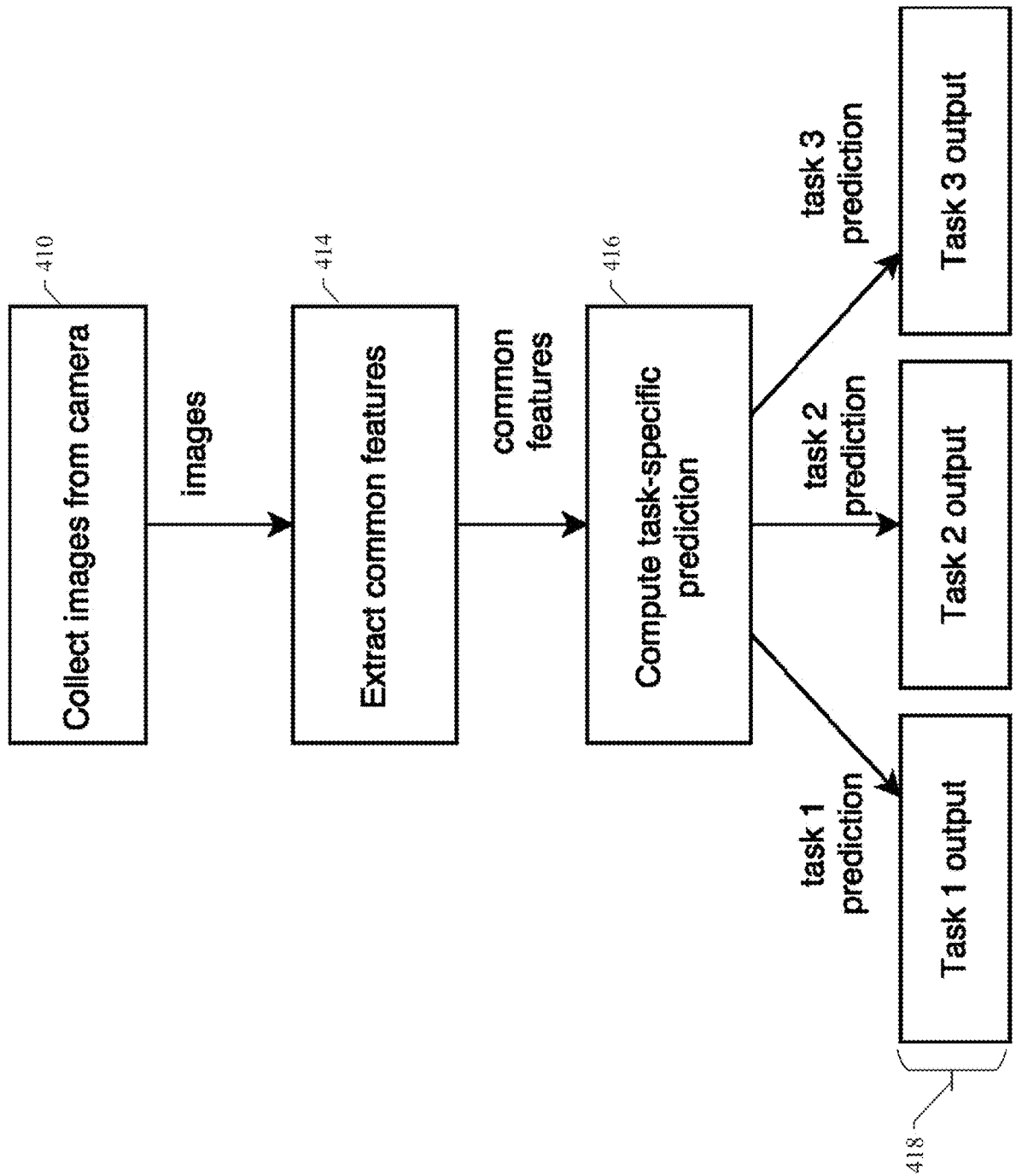
FIG. 4 illustrates a detail of the second phase for operational or simulation use of the autonomous vehicle computation and control system in an example embodiment.

FIG. 4 illustrates a detail of the second phase for operational or simulation use of the autonomous vehicle computation and control system in an example embodiment. As described above, the multiple trained tasks with their properly adjusted parameters can be deployed in an operational or simulation phase. In a first operational block 410 shown in FIG. 4, images are collected and provided to the autonomous vehicle computation and control system 210 by the image data collection system 205. As described above, the images can be real world images, simulated images, or the like as collected from cameras, sensors, or other perception devices on or associated with an autonomous vehicle. The images can include one or more lane marking features corresponding to lane markings on a roadway. As shown in FIG. 4, the image data collected in block 410 can be provided to a processing block 414 of the autonomous vehicle computation and control system 210, where the features of the image data can be extracted. Semantic segmentation or similar processes can be used for the feature extraction. As well-known, feature extraction can provide a pixel-level object label for each feature identified in the image data. In many cases, the image data will contain features with common characteristics, such as lane marking features. The autonomous vehicle computation and control system 210 can associate the multiple trained tasks with the features identified in the image data. Alternatively, the autonomous vehicle computation and control system 210 can use the multiple trained tasks to identify features or feature characteristics in the image data. Because of the offline training phase as described above, the multiple tasks have been trained to accurately predict features, feature characteristics, or feature labels in the input image data. In block 416, each task of the multiple trained tasks can execute concurrently to produce a prediction output for each of the corresponding tasks as shown in FIG. 4. As a result, a plurality of task-specific prediction outputs are produced in blocks 418. Because each of the multiple tasks were trained in the offline training phase as described above, the task-specific prediction outputs 418 produced in the operational or simulation phase are highly accurate. In fact, the task-specific prediction outputs are configured to be accurate to a level within the threshold established by the pre-defined confidence level as described above. Moreover, because the multiple trained tasks can be executed concurrently, the input image data can be processed very quickly, which is critical for operation in the real-time environment of autonomous vehicles. The autonomous vehicle computation and control system 210 can process the input image data with the plurality of trained tasks to produce image feature predictions 220, which can be used by other autonomous vehicle subsystems to configure or control the operation of the autonomous vehicle.

Application for Instance-Level Lane Detection for Autonomous Vehicle Control

One application of the multitask processing environment of an example embodiment as described above is the allocation of different tasks to different instances of lane markings detected in an input image. In this manner, instance-level lane detection using image segmentation can be achieved. Instance-level lane segmentation is the task configured for recognizing all the lanes or lane markings in an input image, and distinguishing each lane instance from other lane instances from the same image. In an example embodiment, the instance-level lane segmentation process can be treated as a pixel-level classification task, where each class corresponds to one instance of a lane marking feature detected in an input image. By assigning each instance of a lane marking with a label according to the location of the lane marking instance, the example embodiment can use a multi-class classification process to achieve instance-level lane segmentation.

In an example embodiment, a cascade classification process can be used. Although the final goal of the process is to recognize each instance of lane markings in the input images, each instance of lane markings is intrinsically similar to each other instance of lane markings at the pixel level. As a result, the example embodiment can use a cascade classification process, wherein a first process operation is performed to recognize lane marking objects or features in the input images, and then a second process operation is performed to label each instance of the recognized lane marking objects or features based on the location of each instance in the image. In other words, the first process operation is used to recognize lane marking objects or features and to extract these lane marking objects or features as proposals. Then, the second process operation is performed to assign an instance label to each of the proposals. In a particular embodiment, a well-known focal loss function can be used to mitigate two problems that may occur in object detection, class imbalance and hard example mining.

Because the instance-level lane segmentation process of an example embodiment can use translation-variant information of the input, some common image augmentation methods, such as flipping and random cropping, may need to be suppressed. Instead, the example embodiment can use scaling operations on the input images during training, in order to enhance the robustness of the images without confusing the neural network with inconsistent inputs.

Figure 5:
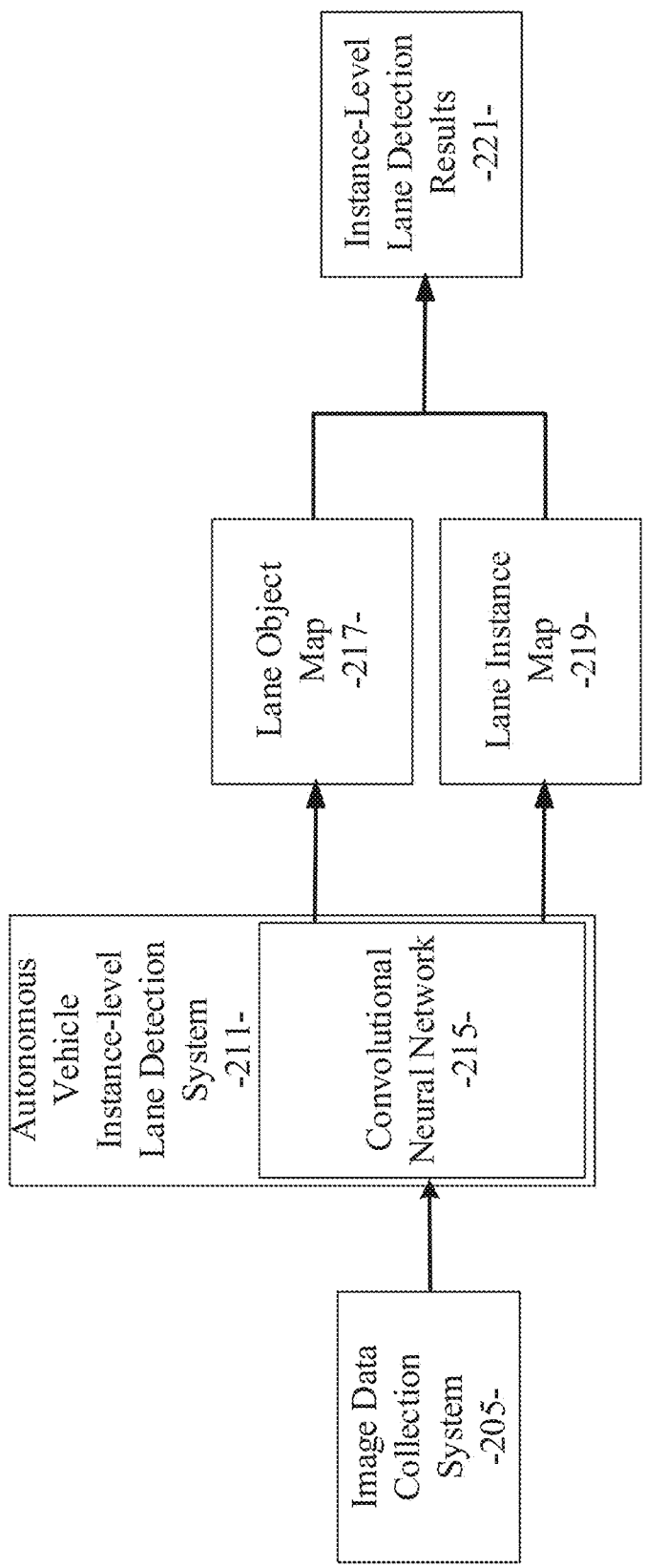
FIG. 5 illustrates a second phase for operational or simulation use of the instance-level lane detection system in an example embodiment.

FIG. 5 illustrates a second phase for operational or simulation use of an autonomous vehicle instance-level lane detection system 211 in an example embodiment. As shown in FIG. 5, the autonomous vehicle instance-level lane detection system 211 can receive image data from the image data collection system 205. The image data collection system 205 can include an array of perception information gathering devices, sensors, and/or image generating devices on or associated with an autonomous vehicle, similar to the perception information gathering devices of the image data collection system 201. As described above, the autonomous vehicle instance-level lane detection system 211, similar to the autonomous vehicle computation and control system 210, can use a trained convolutional neural network 215, or other machine learning system, to process the input image data with the plurality of trained tasks to produce a lane object map 217 and a lane instance map 219. Instance-level lane detection results 221 can be generated from the lane object map 217 and the lane instance map 219. The instance-level lane detection results 221 can be used by other autonomous vehicle subsystems to configure or control the operation of the autonomous vehicle based on the detection and location of the instance-level lane markings. Thus, a system and method for instance-level lane detection for autonomous vehicle control are disclosed.

Figure 6:
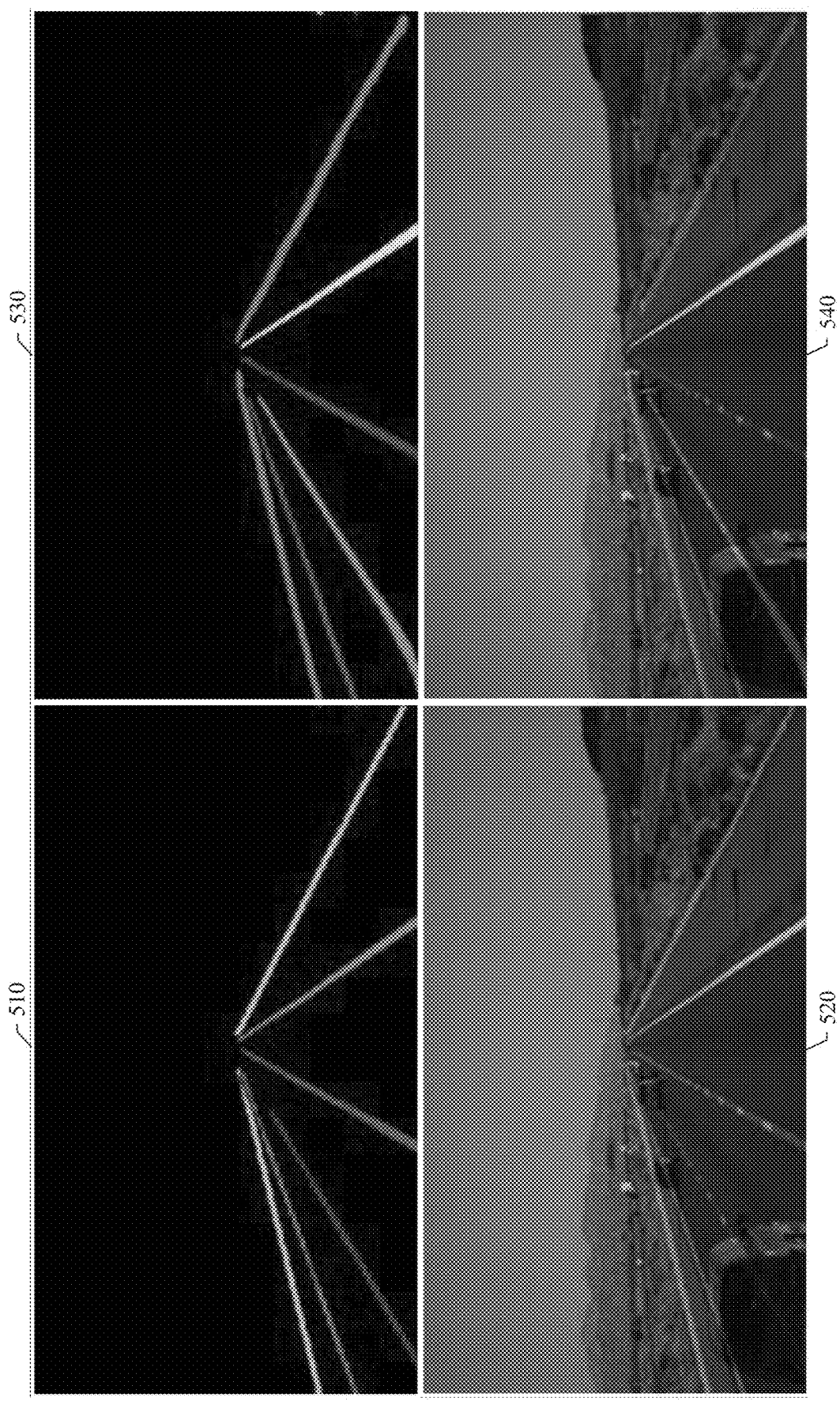
FIGS. 6 and 7 illustrate examples of an instance-level lane detection map representing a form of the instance-level lane detection results generated by the example embodiments.
Figure 7:
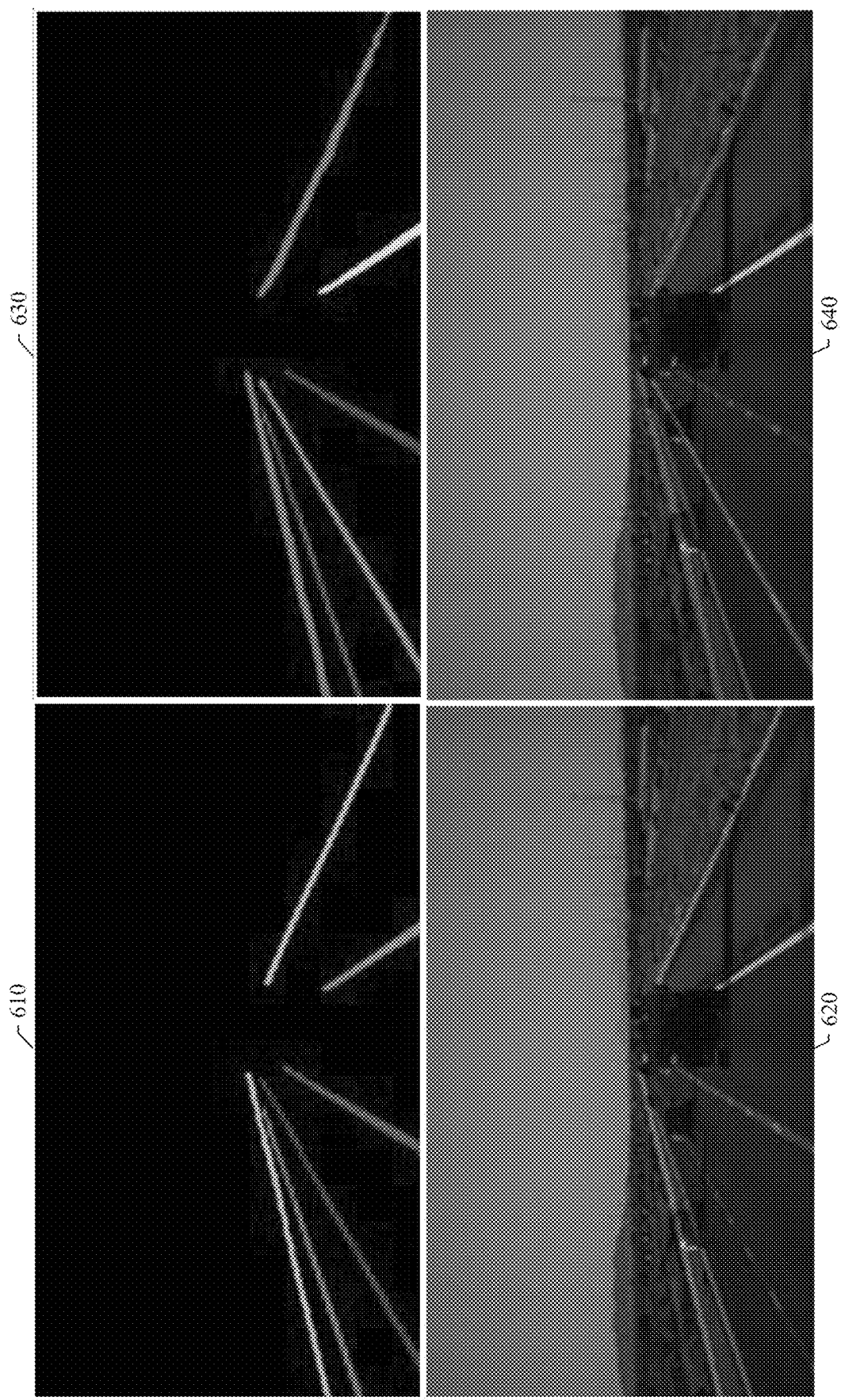

FIGS. 6 and 7 illustrate examples of an instance-level lane detection map representing a form of the instance-level lane detection results 221 generated by the example embodiments. Referring to FIG. 6, the first example illustrates a set of four images in four quadrants of the diagram: blocks 510 through 540. Image block 510 illustrates a ground truth annotated object map, which identifies each of the instances of lanes in the sample image. Such a ground truth annotated object map could be generated as training data and used to train the autonomous vehicle computation and control system 210 of an example embodiment as described above. Image block 520 illustrates a visualization of the ground truth annotated object map of block 510 overlaying the first sample image. Note that the different colors representing each of the lane instances identify and differentiate each of the different instances of lanes in the sample image. The ordering or particular colors representing each lane instance do not matter as long as each lane instance is uniquely identified in the image. In the sample image shown, the leftmost lane instance representation and the rightmost lane instance representation correspond to roadway curbs or the edges of road surface.

Referring still to FIG. 6, image block 530 illustrates an instance-level lane detection map, which identifies the predicted lane instances produced by the trained autonomous vehicle computation and control system 210 after analysis of the first sample image as described above. Image block 540 illustrates a visualization of the instance-level lane detection map of block 530 overlaying the first sample image. Note that the locations of each of the predicted lane instances in the sample image correlate well to the actual lane instance locations represented in the ground truth annotated object map of block 510. Thus, the trained autonomous vehicle computation and control system 210 performs an accurate analysis of an input image to detect and identify specific instances of lane markings in the input image.

Referring now to FIG. 7, a second example illustrates another set of four images in four quadrants of the diagram: blocks 610 through 640. Image block 610 illustrates a ground truth annotated object map for the second sample image, which identifies each of the instances of lanes in the second sample image. Image block 620 illustrates a visualization of the ground truth annotated object map of block 610 overlaying the second sample image. Referring still to FIG. 7, image block 630 illustrates an instance-level lane detection map, which identifies the predicted lane instances produced by the trained autonomous vehicle computation and control system 210 after analysis of the second sample image as described above. Image block 640 illustrates a visualization of the instance-level lane detection map of block 630 overlaying the second sample image. Note that the locations of each of the predicted lane instances in the second sample image correlate well to the actual lane instance locations represented in the ground truth annotated object map of block 610. Thus, the trained autonomous vehicle computation and control system 210 performs an accurate analysis of an input image to detect and identify specific instances of lane markings in the input image.

Figure 8:
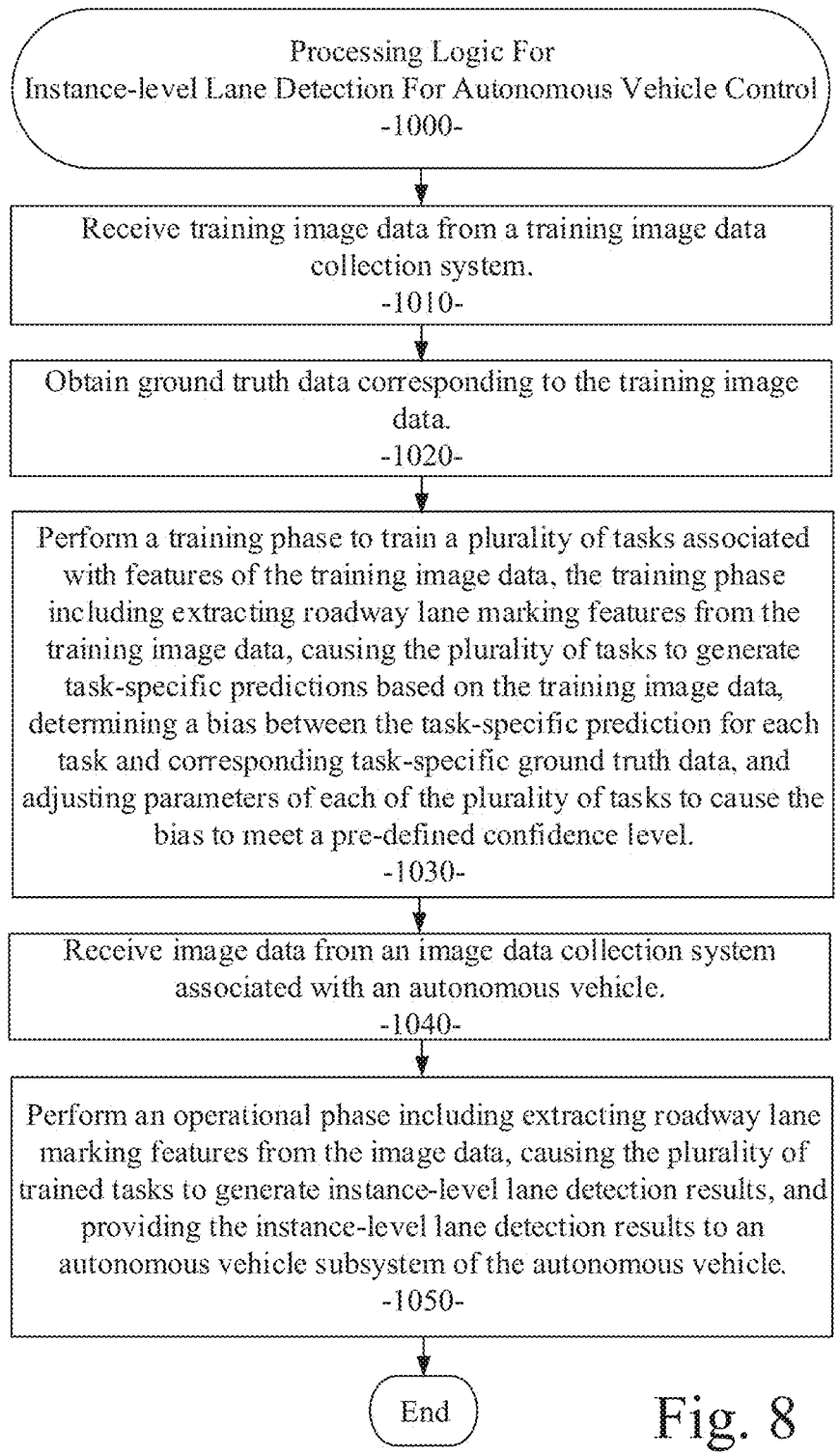
FIG. 8 is a process flow diagram illustrating an example embodiment of a system and method for instance-level lane detection for autonomous vehicle control.

Referring now to FIG. 8, a flow diagram illustrates an example embodiment of a system and method 1000 for instance-level lane detection for autonomous vehicle control. The example embodiment can be configured for: receiving training image data from a training image data collection system (processing block 1010); obtaining ground truth data corresponding to the training image data (processing block 1020); performing a training phase to train a plurality of tasks associated with features of the training image data, the training phase including extracting roadway lane marking features from the training image data, causing the plurality of tasks to generate task-specific predictions based on the training image data, determining a bias between the task-specific prediction for each task and corresponding task-specific ground truth data, and adjusting parameters of each of the plurality of tasks to cause the bias to meet a pre-defined confidence level (processing block 1030); receiving image data from an image data collection system associated with an autonomous vehicle (processing block 1040); and performing an operational phase including extracting roadway lane marking features from the image data, causing the plurality of trained tasks to generate instance-level lane detection results, and providing the instance-level lane detection results to an autonomous vehicle subsystem of the autonomous vehicle (processing block 1050).

Figure 9:
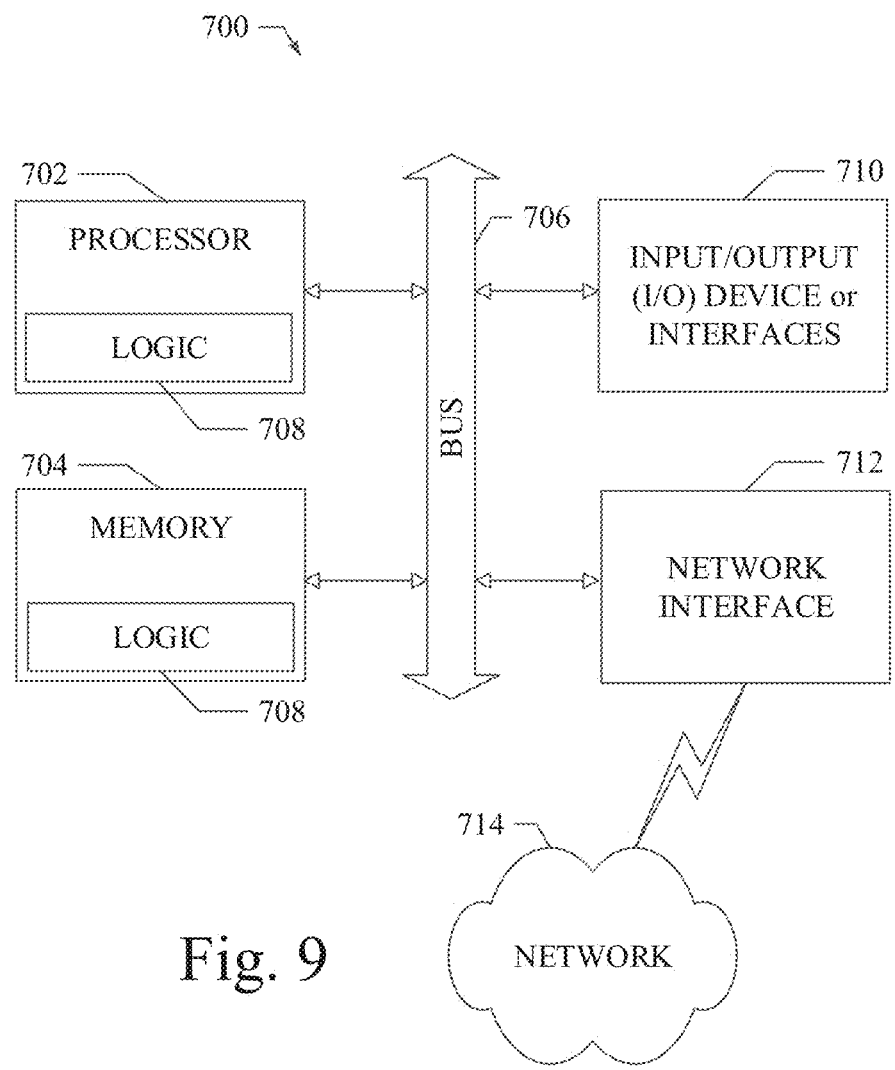
FIG. 9 shows a diagrammatic representation of machine in the example form of a computer system within which a set of instructions when executed may cause the machine to perform any one or more of the methodologies discussed herein.

FIG. 9 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
a data processor; and
a memory for storing an autonomous vehicle instance-level lane detection system, executable by the data processor, the autonomous vehicle instance-level lane detection system being configured to:
receive image data from an image data collection system associated with an autonomous vehicle;
perform an operational phase comprising extracting roadway lane marking features from the image data, causing a plurality of trained tasks to execute concurrently to generate instance-level lane detection results based on the image data, the plurality of trained tasks having been individually trained with different features of training image data received from a training image data collection system and corresponding ground truth data, the training image data and the ground truth data comprising data collected from real-world traffic scenarios;
cause the plurality of trained tasks to generate task-specific predictions of feature characteristics based on the image data and to generate corresponding instance-level lane detection results, the instance-level lane detection results including a lane instance map, which identifies and differentiates each of a plurality of different lane instances present in the image data;
provide the instance-level lane detection results to an autonomous vehicle subsystem of the autonomous vehicle; and
control operation of the autonomous vehicle based on the instance-level lane detection results.

2. The system of claim 1 being further configured to extract instances of roadway lane marking features from image data, and cause the plurality of trained tasks to generate instance-level lane detection results, wherein instance-level lane detection corresponds to detection of different instances of a same lane marking feature type.

3. The system of claim 1 being further configured to generate a lane object map and the lane instance map based on the extracted roadway lane marking features.

4. The system of claim 1 wherein the image data collection system comprises sensors installed in the autonomous vehicle.

5. The system of claim 1 being further configured to receive a plurality of images gathered from a plurality of perception devices by the image data collection system.

6. The system of claim 1 being further configured to receive sensor data from a plurality of perception devices.

7. The system of claim 1 wherein at least one task of the plurality of tasks corresponding to a specific feature of the image data.

8. A method for autonomous vehicle instance-level lane detection, the method comprising:
receiving image data from an image data collection system associated with an autonomous vehicle;
performing an operational phase comprising extracting roadway lane marking features from the image data, causing a plurality of trained tasks to execute concurrently to generate instance-level lane detection results based on the image data, the plurality of trained tasks having been individually trained with different features of training image data received from a training image data collection system and corresponding ground truth data, the training image data and the ground truth data comprising data collected from real-world traffic scenarios;
causing the plurality of trained tasks to generate task-specific predictions of feature characteristics based on the image data and to generate corresponding instance-level lane detection results, the instance-level lane detection results including a lane instance map, which identifies and differentiates each of a plurality of different lane instances present in the image data;
providing the instance-level lane detection results to an autonomous vehicle subsystem of the autonomous vehicle; and
controlling operation of the autonomous vehicle based on the instance-level lane detection results.

9. The method of claim 8 further comprising extracting features to provide a pixel-level object label for each roadway lane marking feature.

10. The method of claim 8 further comprising generating a lane object map and the lane instance map based on the extracted roadway lane marking features and determining a computed loss value with a bias.

11. The method of claim 8 including associating similar extracted features with a corresponding task of the plurality of tasks, and associating different extracted features with different other tasks of the plurality of tasks.

12. The method of claim 8 further comprising receiving a plurality of images gathered from a plurality of perception devices by the image data collection system and associating a weight to each of the plurality of tasks.

13. The method of claim 8 further comprising receiving sensor data from a plurality of perception devices, the plurality of perception devices comprising cameras and sensors.

14. The method of claim 8 further comprising configuring a control system in an autonomous vehicle based on results produced by the plurality of trained tasks.

15. A non-transitory machine-useable storage medium embodying instructions which, when executed by a machine, cause the machine to:
receive image data from an image data collection system associated with an autonomous vehicle;
perform an operational phase comprising extracting roadway lane marking features from the image data, causing a plurality of trained tasks to execute concurrently to generate instance-level lane detection results based on the image data, the plurality of trained tasks having been individually trained with different features of training image data received from a training image data collection system and corresponding ground truth data, the training image data and the ground truth data comprising data collected from real-world traffic scenarios;
cause the plurality of trained tasks to generate task-specific predictions of feature characteristics based on the image data and to generate corresponding instance-level lane detection results, the instance-level lane detection results including a lane instance map, which identifies and differentiates each of a plurality of different lane instances present in the image data;
provide the instance-level lane detection results to an autonomous vehicle subsystem of the autonomous vehicle; and
control operation of the autonomous vehicle based on the instance-level lane detection results.

16. The non-transitory machine-useable storage medium of claim 15 being further configured to detect different instances of a same lane marking feature type.

17. The non-transitory machine-useable storage medium of claim 15 being further configured to generate a lane object map and the lane instance map based on the extracted roadway lane marking features using a neural network.

18. The non-transitory machine-useable storage medium of claim 15 being further configured to receive a plurality of training images gathered from a plurality of perception devices by a training image data collection system and processed by human labelers and automated processes.

19. The non-transitory machine-useable storage medium of claim 15 being further configured to:
receive training image data from a training image data collection system, the training image data collection system comprising sensors installed in a moving test vehicle navigated through real-world traffic scenarios, the training image data comprising data collected from real-world traffic scenarios;
perform a training phase to train the plurality of tasks each associated with different features of the training image data, at least one task of the plurality of tasks corresponding to a specific feature of the training image data, the plurality of tasks configured to execute concurrently, the training phase comprising extracting roadway lane marking features from the training image data, associating similar extracted features with a corresponding task of the plurality of tasks, associating different extracted features with different other tasks of the plurality of tasks, causing the plurality of tasks to generate task-specific predictions of feature characteristics based on the training image data, determining a bias between the task-specific prediction for each task and corresponding task-specific ground truth data, and adjusting parameters of each of the plurality of tasks to cause the bias to meet a pre-defined confidence level.

20. The non-transitory machine-useable storage medium of claim 15 wherein the plurality of tasks are associated with shared layers among different pixel-level image segmentation.

* * * * *